(12) United States Patent
Kuo et al.

(10) Patent No.: US 11,059,726 B2
(45) Date of Patent: Jul. 13, 2021

(54) FLUORESCENT MATERIAL AND METHOD FOR MAKING THE SAME

(71) Applicant: Daxin Materials Corp., Taichung (TW)

(72) Inventors: Kuo-Huai Kuo, Taichung (TW); Yu-Pu Wang, Taichung (TW); Fu-Shan Chen, Taichung (TW)

(73) Assignee: DAXIN MATERIALS CORP., Taichung (TW)

( * ) Notice: Subject to any disclaimer, the term of this patent is extended or adjusted under 35 U.S.C. 154(b) by 409 days.

(21) Appl. No.: 16/247,921

(22) Filed: Jan. 15, 2019

(65) Prior Publication Data

US 2019/0218108 A1    Jul. 18, 2019

(30) Foreign Application Priority Data

Jan. 18, 2018    (TW) .................................. 107101801

(51) Int. Cl.
*C01G 21/00* (2006.01)
*C09K 11/66* (2006.01)
*C09K 11/71* (2006.01)

(52) U.S. Cl.
CPC .......... *C01G 21/006* (2013.01); *C09K 11/663* (2013.01); *C09K 11/664* (2013.01); *C09K 11/665* (2013.01); *C09K 11/712* (2013.01); *C09K 11/715* (2013.01); *C01P 2006/90* (2013.01)

(58) Field of Classification Search
CPC ... C09K 11/663; C09K 11/664; C09K 11/665; C09K 11/714; C09K 11/715; C01G 21/006

See application file for complete search history.

(56) References Cited

U.S. PATENT DOCUMENTS

2017/0309407 A1* 10/2017 Suzuka .................. H01L 31/00

* cited by examiner

*Primary Examiner* — C Melissa Koslow
(74) *Attorney, Agent, or Firm* — Hamre, Schumann, Mueller & Larson, P.C.

(57) ABSTRACT

A fluorescent material includes at least one fluorescent compound having a structure formula of $ABX_ZY_{3-Z}$ as defined in the specification, a plurality of $NH_3^+$ group-containing ions bound to the fluorescent compound through protonation of amine groups of an amine composition, and a plurality of $COO^-$ group-containing ions bound to the fluorescent compound through deprotonation of carboxyl groups of an acid composition. The amine composition has a total hydrogen bonding Hansen solubility parameter ($T\delta_H$) ranges from 2.4 to 3.3 $(cal/cm^3)^{1/2}$, and the acid composition has a total polar Hansen solubility parameter ($T\delta_P$) which is less than 1.4 $(cal/cm^3)^{1/2}$.

13 Claims, 4 Drawing Sheets

FLUORESCENT MATERIAL AND METHOD FOR MAKING THE SAME

CROSS-REFERENCE TO RELATED APPLICATION

This application is based on, and claims priority from Taiwanese invention patent application no. 107101801, filed on Jan. 18, 2018, the disclosure of which is hereby incorporated by reference herein in its entirety.

FIELD

The disclosure relates to a fluorescent material and a method for making the same, more particularly to a fluorescent material which contains therein at least one fluorescent compound, and which may provide stable fluorescence properties in a solvent for a resist, and a method for making the fluorescent material.

BACKGROUND

Perovskite nanomaterials have excellent optical and electrical properties and are applied in productions of solar cells and light emitting diodes. Many researches focus on metal halides with a perovskite structure of $ABX_3$.

For example, colloidal nanocrystals (NCs) of cesium lead halides ($CsPbX_3$, X=Cl, Br, I) exhibit bright photoluminescence, with emission tunable over the entire visible spectral region. For further improvement, Jonathan De Roo et al. propose in a paper entitled "Highly dynamic ligand binding and light absorption coefficient of cesium lead bromide perovskite nanocrystals," ACS nano 2016, 10(2), pp 2071-2081 that by addition of a small amount of both oleic acid and oleylamine, the NCs can be purified. In addition, a high amine content in the ligand shell increases the quantum yield due to the improved binding of the carboxylic acid.

However, the inventors of this application found that when preparing a color resist using metal halides with a perovskite structure, the metal halides may not provide stable fluorescence properties in a resist solvent, for example, propylene glycol methyl ether acetate (PGMEA), which may result in a non-stable light emitting efficiency of the color resist. This calls for a study on how to make the metal halide with a perovskite structure stable in the resist solvent, and maintain a stable fluorescence property.

SUMMARY

Therefore, an object of the disclosure is to provide a fluorescent material which contains therein at least one fluorescent compound of a perovskite structure, and which may provide stable fluorescence properties in a solvent for a resist. A method for making the fluorescent material is also provided.

According to a first aspect of the disclosure, a fluorescent material includes at least one fluorescent compound having a structure formula of $ABX_ZY_{3-Z}$, where A is Cs, $CH_3NH_3$, or $CH(NH_2)_2$, B is Pb, Sn or Sr, X and Y are different atoms, and are independently selected from the group consisting of Cl, Br, and I, with the proviso that when one of X and Y is Cl, the other one of X and Y is not I, and $0 \leq X \leq 3$;

a plurality of $NH_3^+$ group-containing ions which are the same or different ions, and which are made from protonation of an amine composition, the amine composition being composed of at least one type of amine group-containing compound, and having a total hydrogen bonding Hansen solubility parameter ($T\delta_H$) which ranges from 2.4 to 3.3 $(cal/cm^3)^{1/2}$; and a plurality of $COO^-$ group-containing ions which are the same or different ions, and which are made from deprotonation of an acid composition, the acid composition being composed of at least one type of carboxyl group-containing compound, and having a total polar Hansen solubility parameter ($T\delta_P$) which is less than 1.4 $(cal/cm^3)^{1/2}$, wherein the total hydrogen bonding Hansen solubility parameter ($T\delta_H$) satisfies $$T\delta_H = \sum_x W_x \times \delta_{H,x}$$

where x is a number of the at least one type of the amine group-containing compound, $W_x$ is a weight ratio of the amine group-containing compound based on the total weight of the amine composition, and $\delta_{H,x}$ is a hydrogen bonding Hansen solubility parameter of the amine group-containing compound;

wherein the total polar Hansen solubility parameter ($T\delta_P$) satisfies $$T\delta_P = \sum_y W_y \times \delta_{P,y}$$

where y is a number of the at least one type of the carboxyl group-containing compound, $W_y$ is a weight ratio of the carboxyl group-containing compound, based on the total weight of the acid composition, and $\delta_{P,y}$ is a polar Hansen solubility parameter of the carboxyl group-containing compound; and wherein the $NH_3^+$ group-containing ions and the $COO^-$ group-containing ions are bound to the fluorescent compound.

According to a second aspect of the disclosure, a method for making the fluorescent material includes the steps of:

(i) heating and reacting a mixture of the amine composition, the acid composition, and at least one halide compound with a structure formula of $BW_2$, to obtain a precursor, wherein W is Cl, Br, or I, with the proviso that when two types of the halide compounds are being used, the two types are not $BCl_2$ and $BI_2$, respectively; and (ii) heating and reacting a mixture of the precursor and a first solution composed of a solvent and a compound containing moiety A of the $ABX_ZY_{3-Z}$ structure, to obtain the fluorescent material.

Because the amine composition and the acid composition respectively have the specific total hydrogen bonding Hansen solubility parameter ($T\delta_H$) and the specific total polar Hansen solubility parameter ($T\delta_P$), the fluorescent material made from those compositions may maintain stable fluorescence properties in a solvent for a resist.

BRIEF DESCRIPTION OF THE DRAWINGS

Other features and advantages of the disclosure will become apparent in the following detailed description of the embodiment(s) with reference to the accompanying drawings, in which.

DETAILED DESCRIPTION

Figure 1:
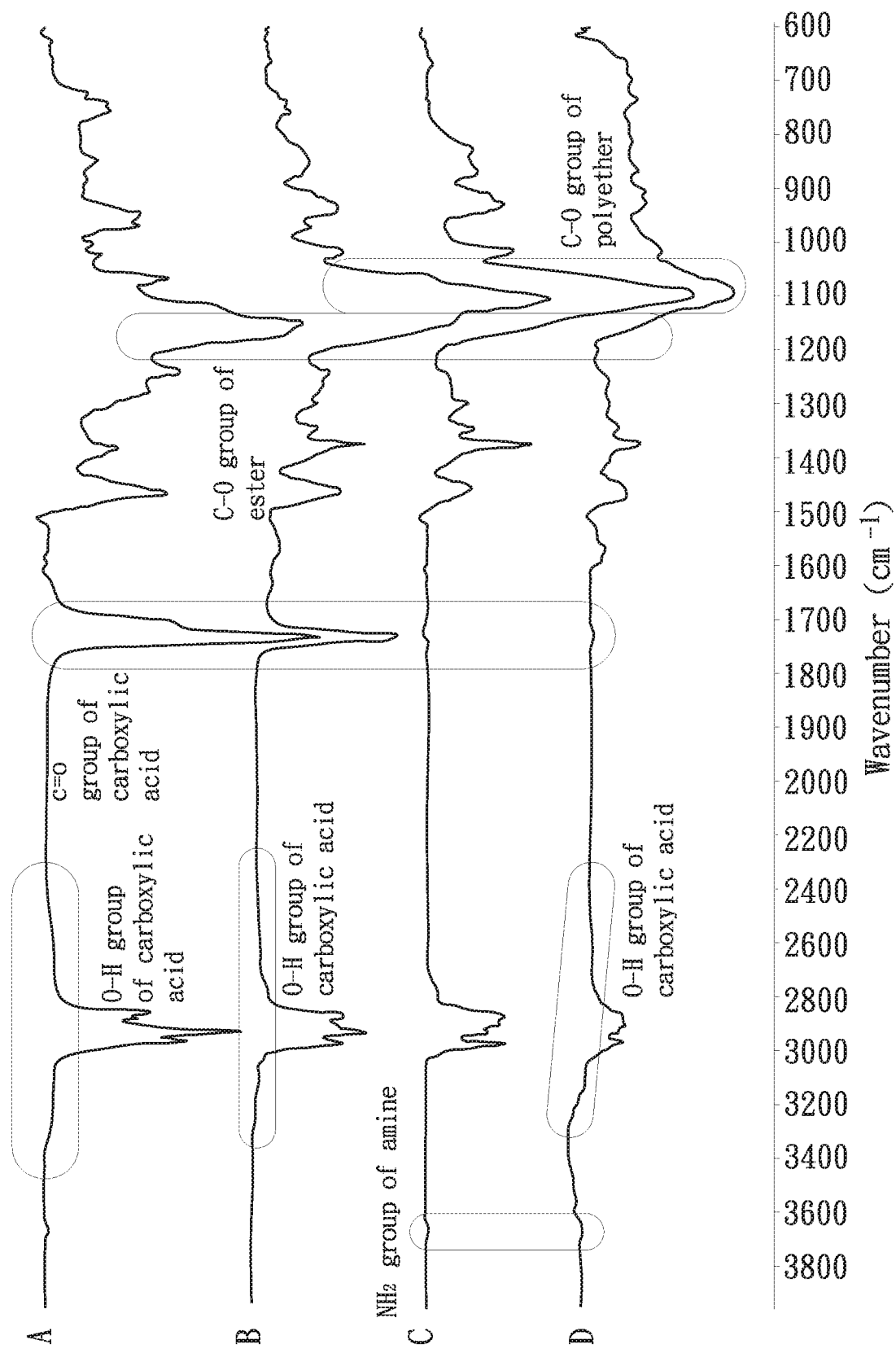
FIG. 1 illustrates IR spectra for an acid composition used in Example 1 (spectrum A), an amine composition used in Example 1 (spectrum C), a mixture of the acid and amine compositions used in Example 1 (spectrum B), and a fluorescent material obtained in Example 1 (spectrum D)

A fluorescent material according to an embodiment to the disclosure includes at least one fluorescent compound, a plurality of $NH_3^+$ group-containing ions, and a plurality of $COO^-$ group-containing ions. The $NH_3^+$ group-containing ions and the $COO^-$ group-containing ions are bound to the fluorescent compound.

The fluorescent compound has a structure formula of $ABX_ZY_{3-Z}$, where A is Cs, $CH_3NH_3$, or $CH(NH_2)_2$ (i.e., amidino ion), B is Pb, Sn or Sr, X and Y are different atoms, and are independently selected from the group consisting of Cl, Br, and I, with the proviso that when one of X and Y is Cl, the other one of X and Y is not I, and $0 \leq Z \leq 3$.

Preferably, the fluorescent compound is selected from the group consisting of $CsPbBr_3$, $CsPbCl_3$, $CsPbI_3$, $CsPbCl_ZBr_{3-Z}$, and $CsPbBr_ZI_{3-Z}$. In an example of the disclosure, the fluorescent compound is $CsPbBr_3$; in another example of the disclosure, the fluorescent compound is $CsPbBrI_2$; in yet another example of the disclosure, the fluorescent compound is $CsPbCl_{1.5}Br_{1.5}$.

The $NH_3^+$ group-containing ions are the same or different ions, and are made from protonation of an amine composition. The amine composition is composed of at least one type of amine group-containing compound, and has a total hydrogen bonding Hansen solubility parameter ($T\delta_H$) which ranges from 2.4 to 3.3 $(cal/cm^3)^{1/2}$, and which satisfies $$T\delta_H = \sum_x W_x \times \delta_{H,x} \quad \text{(Equation 1)}$$

where x is a number of the at least one type of the amine group-containing compound, $W_x$ is a weight ratio of the amine group-containing compound based on the total weight of the amine composition, and $\delta_{H,x}$ is a hydrogen bonding Hansen solubility parameter of the amine group-containing compound.

Preferably, the amine group-containing compound is selected from the group consisting of (alkyl)polyetheramine, and poyetherdiamine. The (alkyl)polyetheramine represents polyetheramine or alkyl polyetheramine. A non-limiting example of (alkyl)polyetheramine may be a commercial product of Jeffamine® M2005 available from Huntsman. A non-limiting example of polyetherdiamine may be a commercial product of Jeffamine® D2010 available from Huntsman.

The $COO^-$ group-containing ions are the same or different ions, and are made from protonation of an amine composition. The acid composition is composed of at least one type of carboxyl group-containing compound, and has a total polar Hansen solubility parameter ($T\delta_P$) which is less than 1.4 $(cal/cm^3)^{1/2}$, and which satisfies $$T\delta_P = \sum_y W_y \times \delta_{P,y} \quad \text{(Equation 2)}$$

where y is a number of the at least one type of the carboxyl group-containing compound, $W_y$ is a weight ratio of the carboxyl group-containing compound based on the total weight of the acid composition, and $\delta_{P,y}$ is a polar Hansen solubility parameter of the carboxyl group-containing compound.

Preferably, the carboxyl group-containing compound is selected from the group consisting of olefin acid, a copolymer of (meth)acrylic acid and (meth)acrylic acid alkyl ester, and a copolymer of (meth)acrylic acid, (meth)acrylic acid alkyl ester, and hydroxyalkyl acrylate. Please note that (meth)acrylic acid represents methacrylic acid or acrylic acid, and (meth)acrylic acid alkyl ester represents methacrylic acid alkyl ester or acrylic acid alkyl ester. The copolymer of (meth)acrylic acid and (meth)acrylic acid alkyl ester may be obtained by reacting a mixture of (meth)acrylic acid (1~30 wt %), (meth)acrylic acid alkyl ester (50~90 wt %), and a chain elongation agent (1~30 wt %). In an example of the disclosure, the copolymer of (meth)acrylic acid and (meth)acrylic acid alkyl ester is a copolymer of methacrylic acid and methacrylic acid butyl ester, which is prepared by reacting a mixture of methacrylic acid (8 wt %), methacrylic acid butyl ester (65 wt %), and 1-dodecanthiol (27 wt %, a chain elongation agent). More preferably, the copolymer of (meth)acrylic acid and (meth)acrylic acid alkyl ester has a molecular weight ranging from 1000 to 10000.

In an example of the disclosure, the amine group-containing compound is polyetherdiamine and the carboxyl group-containing compound is a copolymer of (meth)acrylic acid and (meth)acrylic acid alkyl ester. In another example of the disclosure, the amine group-containing compound is (alkyl)polyetheramine and the carboxyl group-containing compound is a copolymer of (meth)acrylic acid and (meth)acrylic acid alkyl ester.

$\delta_{H,x}$ of the amine group-containing compound is calculated based on Equation 3, and $\delta_{P,y}$ of the carboxyl group-containing compound is calculated based on Equation 4:

$$\delta_{H,x} = \left[ \frac{\sum_i n \times \Delta V \delta_{H,i}^2}{\sum_i n \times \Delta V_i^2} \right] \quad \text{(Equation 3)}$$

$$\delta_{P,y} = \left[ \frac{\sum_i m \times \Delta V \delta_{P,i}^2}{\sum_i m \times \Delta V_i^2} \right] \quad \text{(Equation 4)}$$

where i represents the type of functional groups for each of the amine group-containing compound and the carboxyl group-containing compound, n is the number of a single functional group in the amine group-containing compound, m is the number of a single function group in the carboxyl group-containing compound, $\Delta V$ is a molar volume for the single functional group in the amine group-containing compound or the carboxyl group-containing compound, $\Delta V \delta_H^2$ is an electronic transfer parameter for the single functional group in the amine group-containing compound, and $\Delta V \delta_P^2$ is a polar parameter for the single function group in the carboxyl group-containing compound.

The values of $\Delta V$, $\Delta V \delta_H^2$, and $\Delta V \delta_P^2$ for each functional group can be found in Charles M. Hansen, "Hansen solubility parameters—A user's handbook," second Edition, p. 10-11, Table 1.1. The hydrogen bonding Hansen solubility parameter ($\delta_H$) and the polar Hansen solubility parameter ($\delta_P$) are also discussed in this handbook.

The fluorescent material of the disclosure may be used in many applications of fluorescence, particularly in preparation of color resists for providing the color resists with a stable light emitting efficiency.

A method for making the fluorescent material according to an embodiment of the disclosure includes steps (i) and (ii).

In step (i), a mixture of the amine composition, the acid composition, and at least one halide compound is heated and reacted to obtain a precursor. The halide compound has a structure formula of $BW_2$, where W is Cl, Br, or I, with the proviso that when two types of the halide compounds are being used, the two types are not $BCl_2$ and $BI_2$, respectively.

Preferably, the halide compound ($BW_2$) is selected from the group consisting of $PbBr_2$, $PbCl_2$, and $PbI_2$. In an example of the disclosure, the halide compound is $PbBr_2$; in another example of the disclosure, two types of the halide compounds were used and are $PbBr_2$ and $PbI_2$; in yet another example, two types of the halide compounds were used and are $PbBr_2$ and $PbCl_2$.

In step (ii), a mixture of the precursor and a first solution is heated and reacted to obtain the fluorescent material. The first solution is composed of a solvent and a compound containing moiety A of the $ABX_ZY_{3-Z}$ structure.

Preferably, the first solution is prepared by reacting a salt containing the moiety A (e.g. $AR^1$), with an organic acid (e.g. $R^2COOH$) in the solvent. Such reaction is as follow:

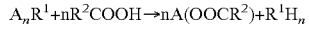

$A_nR^1 + nR^2COOH \rightarrow nA(OOCR^2) + R^1H_n$ where $R^1$ represents an anion group which may be, not limited to, a carbonate group ($CO_3^{2-}$, n=2), a hydroxyl group ($OH^-$, n=1), an acetate ion ($CH_3COO^-$, n=1), etc.; and $R^2$ may be, not limited to, cis-8-heptadecenyl ($C_{17}H_{33}$-, i.e., a residual group obtained by removing a carboxyl group from oleic acid), a residual group obtained by removing a carboxyl group from the above-mentioned copolymer of (meth)acrylic acid and (meth)acrylic acid alkyl ester.

The solvent may be any aprotic solvent which can dissolve the salt (e.g. $AR^1$), and which has no hydroxyl (—OH) group, carboxyl (—COOH) group, or sulfhydryl (—SH) group. The solvent may be, not limited to, 1-octadecene, tetrahydronaphthalene, etc. The heating temperature for preparing the first solution may be, but not limited to, 150° C. The salt (e.g. $AR^1$) may be, but not limited to, $CS_2CO_3$, $CsOH$, $Cs(CH_3COO)$, etc., and in an example of the disclosure, the salt (e.g. $AR^1$) is $Cs_2CO_3$. The organic acid may be, but not limited to, oleic acid, the above-mentioned copolymer of (meth)acrylic acid and (meth)acrylic acid alkyl ester, etc., and in an example of the disclosure, the organic acid is oleic acid.

Based on actual requirement, the first solution is in an amount ranging from 3.0 to 4.5 parts by weight, the amine composition is in an amount ranging from 2 to 30 parts by weight, and the acid composition is in an amount ranging from 5 to 30 parts by weight, based on 1 part by weight of the at least one halide compound.

The embodiments of the disclosure will now be explained in more detail below by way of the following examples and comparative examples. Those examples are intended for purposes of illustration only and are not intended to limit the scope of the present disclosure.

[Preparation Example] Acid Composition PE

Methacrylic acid (8 wt %), methacrylic acid butyl ester (65 wt %), and 1-dodecanthiol (27 wt %, a chain elongation agent) were reacted at 80° C. for 4 hours to obtain an acid composition which is a copolymer having a molecular weight ranging from 1000 to 10000.

[Example 1] Fluorescent Material E1

Preparation of a First Solution $Cs_2CO_3$ (1.25 mmole), oleic acid (3.94 mmole), and 1-octadecene (20 ml) were mixed and reacted at 150° C., to obtain a first solution (0.125 M) composed of 1 mmole of a Cs-containing compound [$Cs(OOCR^2)$, $R^2=C_{17}H_{33}$-] and 1-octadecene.

Preparation of a Fluorescent Material 1 part by weight of $PbBr_2$, 23 parts by weight of polyetherdiamine (a commercial product of Jeffamine® D2010 available from Huntsman, served as an amine composition), and 23 parts by weight of the above-obtained acid composition PE were mixed and reacted at 150° C. After $PbBr_2$ was completely dissolved, 3.6 parts by weight of the above-obtained first solution was further added, follow by stirring at 150° for 1 minute, to obtain a crude product solution. Thereafter, the crude product solution was purified by diluting each part by weight of the crude product solution with 3 parts by weight of toluene and 9 parts by weight of heptanes, followed by centrifugation at 5000 rpm for 10 minutes to collect a precipitate. The precipitate was further purified by repeating the above-purification steps for three times to collect a purified precipitate which is fluorescent material E1.

[Example 2] Fluorescent Material E2

Fluorescent material E2 was prepared according to the process employed for preparing fluorescent material E1 of Example 1 except that in Example 2, polyetheramine (a commercial product of Jeffamine® M2005 available from Huntsman) was used to replace polyetherdiamine and to serve as an amine composition.

[Example 3] Fluorescent Material E3

Fluorescent material E3 was prepared according to the process employed for preparing fluorescent material E1 of Example 1 except that, in Example 3, a mixture including 0.33 part by weight of $PbBr_2$ and 0.84 part by weight of $PbI_2$ was used to replace 1 part by weight of $PbBr_2$ used in Example 1. In addition, in Example 3, the amine composition was composed of 2.5 parts by weight of polyetherdiamine (a commercial product of Jeffamine® D2010 available from Huntsman) and 0.67 part by weight of oleylamine. Furthermore, in Example 3, the amine composition was in an amount of 2.71 parts by weight [(2.5+0.67)/1.17=2.71], the acid composition PE was in an amount of 19.66 parts by weight [23/1.17==19.66], and the first solution was in an amount of 3.08 parts by weight [3.6/1.17=3.08], based on 1 part by weight of the mixture of $PbBr_2$ and $PbI_2$.

[Example 4] Fluorescent Material E4

Fluorescent material E4 was prepared according to the process employed for preparing fluorescent material E1 except that, in Example 4, a mixture including 0.5 part by weight of $PbBr_2$ and 0.38 part by weight of $PbCl_2$ was used to replace 1 part by weight of $PbBr_2$ used in Example 1. In addition, in Example 4, the amine composition was in an amount of 26.14 parts by weight [23/0.88=26.14], the acid composition PE was in an amount of 26.14 parts by weight [23/0.88=26.14], and the first solution was in an amount of 4.09 parts by weight [3.6/0.88=4.09], based on 1 part by weight of the mixture of $PbBr_2$ and $PbCl_2$.

[Example 5] Fluorescent Material E5

Fluorescent material E5 was prepared according to the process employed for preparing fluorescent material E1 of Example 1 except that, in Example 5, 6.4 parts by weight of oleic acid was used to serve as an acid composition.

[Comparative Example 1] Fluorescent Material CE1

Fluorescent material CE1 was prepared according to the process employed for preparing fluorescent material E5 of Example 5 except that, in Comparative Example 1, 6.0 parts by weight of oleylamine was used to serve as the amine composition.

[Comparative Example 2] Fluorescent Material CE2

Fluorescent material CE2 was prepared according to the process employed for preparing fluorescent material E1 of Example 1 except that, in Comparative Example 2, 6.0 parts by weight of oleylamine was used to serve as the amine composition.

[Comparative Example 3] Fluorescent Material CE3

Fluorescent material CE3 was prepared according to the process employed for preparing fluorescent material E1 of Example 1 except that, in Comparative Example 3, 2.3 parts by weight of sebacic acid was used to serve as the acid composition.

[Comparative Example 4] Fluorescent Material CE4

Fluorescent material CE4 was prepared according to the process employed for preparing fluorescent material E1 of Example 1 except that, in Comparative Example 4, 3.5 parts by weight of amantadine was used to serve as the amine composition.

[Comparative Example 5] Fluorescent Material CE5

Fluorescent material CE5 was prepared according to the process employed for preparing fluorescent material E1 of Example 1 except that, in Comparative Example 5, 2.3 parts by weight of 1,12-dodecanediamine was used to serve as the amine composition.

Evaluations

[Ft-Ir Analysis]

Test

Figure 2:
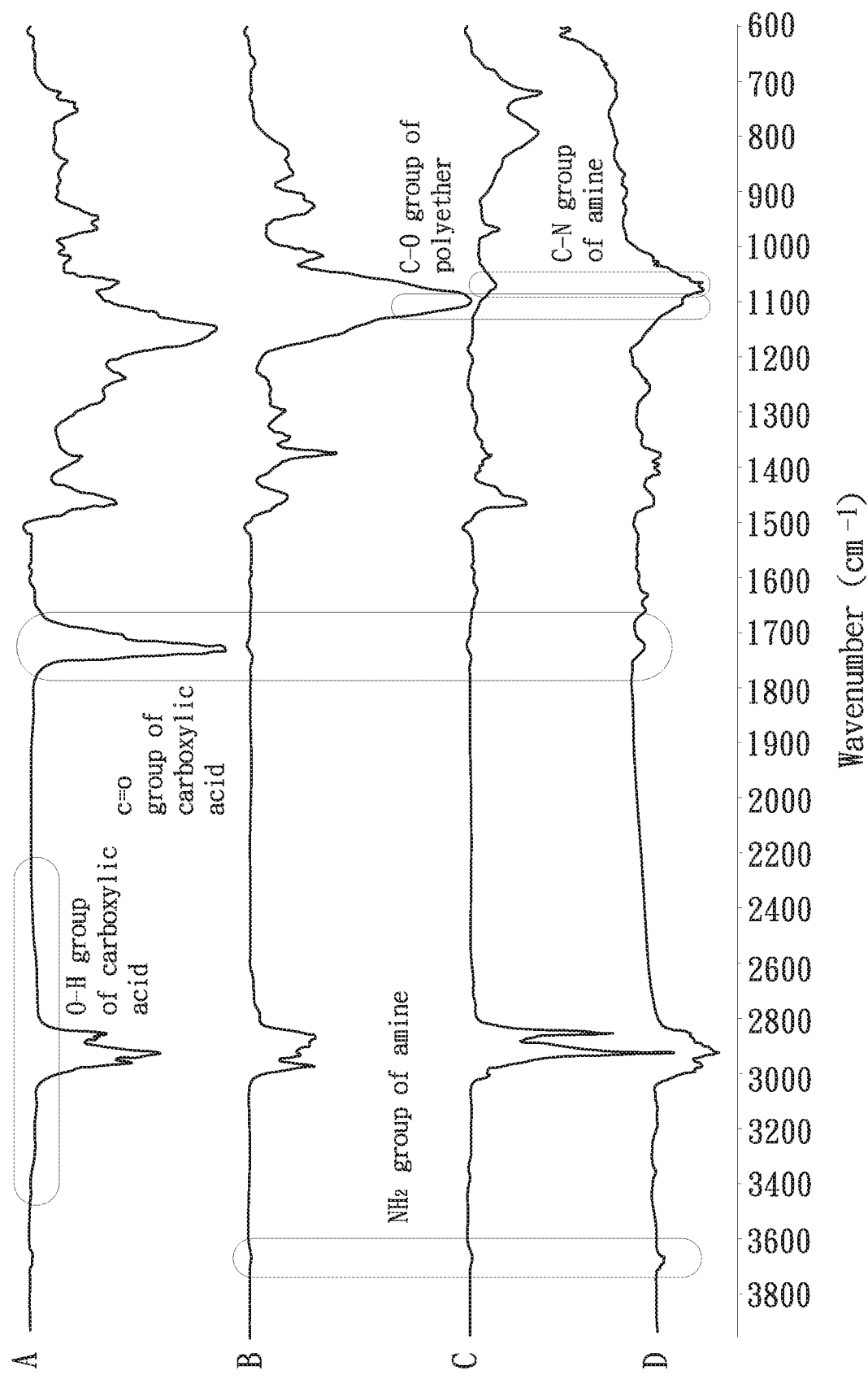
FIG. 2 illustrates IR spectra for an acid composition used in Example 3 (spectrum A), one of two amine group-containing compounds of an amine composition used in Example 3 (spectrum B), the other one of the two amine group-containing compounds used in Example 3 (spectrum C), and a fluorescent material obtained in Example 3 (spectrum D)

The acid composition PE, and the amine composition used in each of Examples 1 and 3, and the fluorescent material obtained in each of Examples 1 and 3 were analyzed by the conventional KBr tablet method using a PerkinElmer Spectrum 100 FTIR spectrometer. Those spectra were collected over a wavenumber range of 600 to 4000 $cm^{-1}$. The results were shown in FIGS. 1 and 2. FIG. 1 shows IR spectra for the acid composition PE used in Example 1 (spectrum A), the amine composition used in Example 1 (spectrum C), the mixture of the acid and amine compositions used in Example 1 (spectrum B), and the fluorescent material E1 obtained in Example 1 (spectrum D). FIG. 2 shows IR spectra for the acid composition PE used in Example 3 (spectrum A), one of polyetherdiamine and oleylamine used in Example 3 (spectrum B), the other one of polyetherdiamine and oleylamine used in Example 3 (spectrum C), and a fluorescent material obtained in Example 3 (spectrum D)

Result

From the result shown in FIG. 1, it can be found that the fluorescent material E1 of Example 1 (spectrum D) has (i) the characteristic absorbance peaks for carboxylic acid (O—H and C=O groups), ester (C—O group), and polyether (C—O group) shown in spectrum B; and (ii) the characteristic absorbance peaks for amine ($NH_2$ group) shown in spectrum C. Therefore, the fluorescent material E1 of Example 1 was indeed provided with the $NH_3^+$ group-containing ions and the $COO^-$ group-containing ions.

From the result shown in FIG. 2, it can be found that the fluorescent material E3 of Example 3 (spectrum D) has the characteristic absorbance peaks shown in spectra A, B, and C. Therefore, the fluorescent material E3 of Example 3 was indeed provided with the $NH_3^+$ group-containing ions and the $COO^-$ group-containing ions.

[Thermogravimetric Analysis (TGA)]

Test

Thermogravimetric analysis of each of the fluorescent materials E1 and E4 was performed using a Q500 Thermogravimetric Analyzer (TA Instruments). Approximately 5~20 mg of sample was placed on a tared platinum TGA pan. The temperature was balanced at 30° C. under nitrogen atmosphere, and then the sample was heated at a rate of 5° C./min until 600° C. The results are shown in FIGS. 3 and 4.

Result

Figure 3:
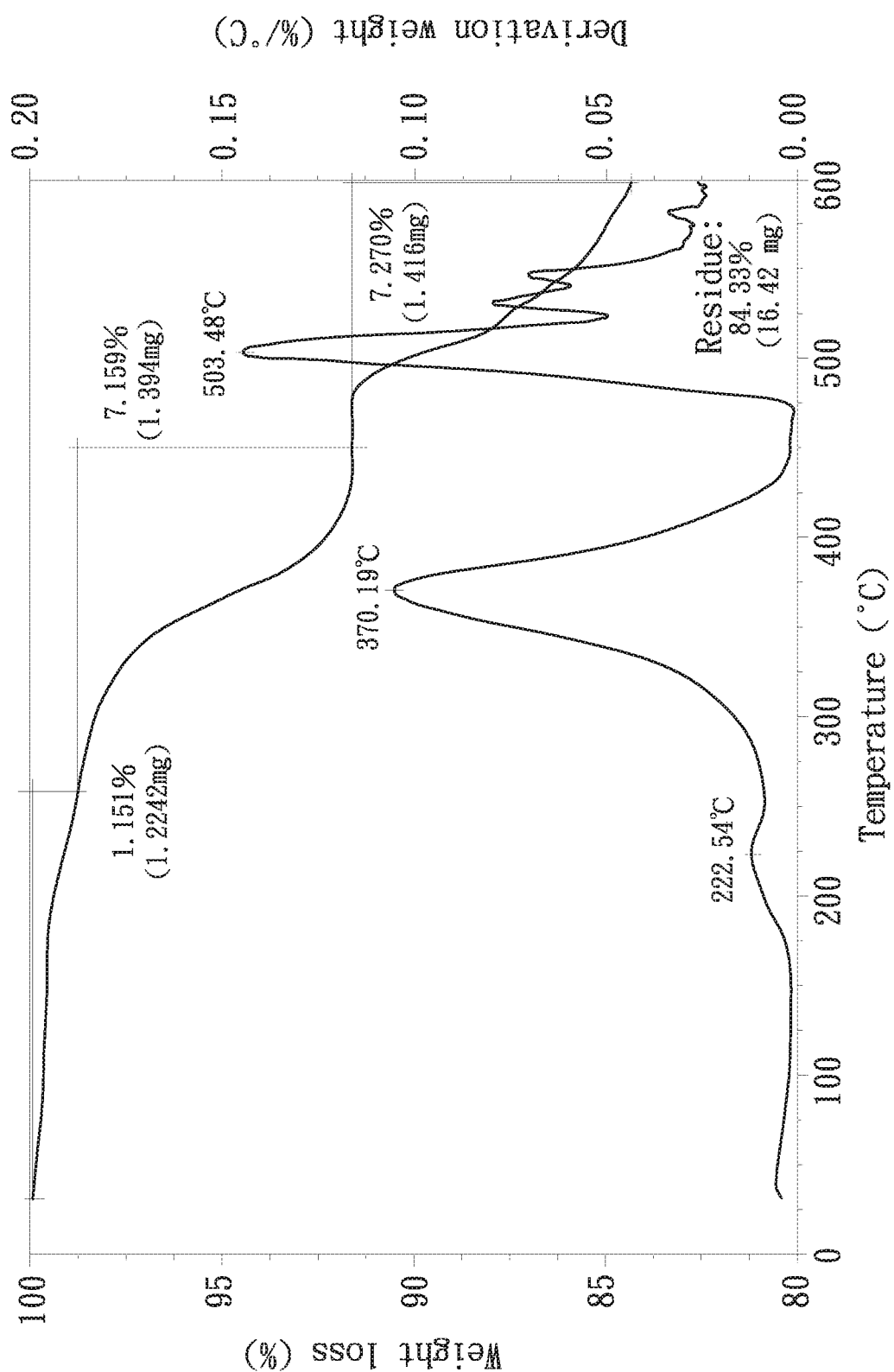
FIG. 3 illustrates a thermogravimetric analysis (TGA) thermogram of the fluorescent material obtained in Example 1.

From the result shown in FIG. 3, the fluorescent material E1 has a weight loss of 8.31.% (1.151%+7.159%) at 460° C. In addition, the sublimation point of CsPbBr3 is about 500~650° C. The weight loss portion of the fluorescent material E1 should be the $NH_3^+$ group-containing ions and the $COO^-$ group-containing ions.

Figure 4:
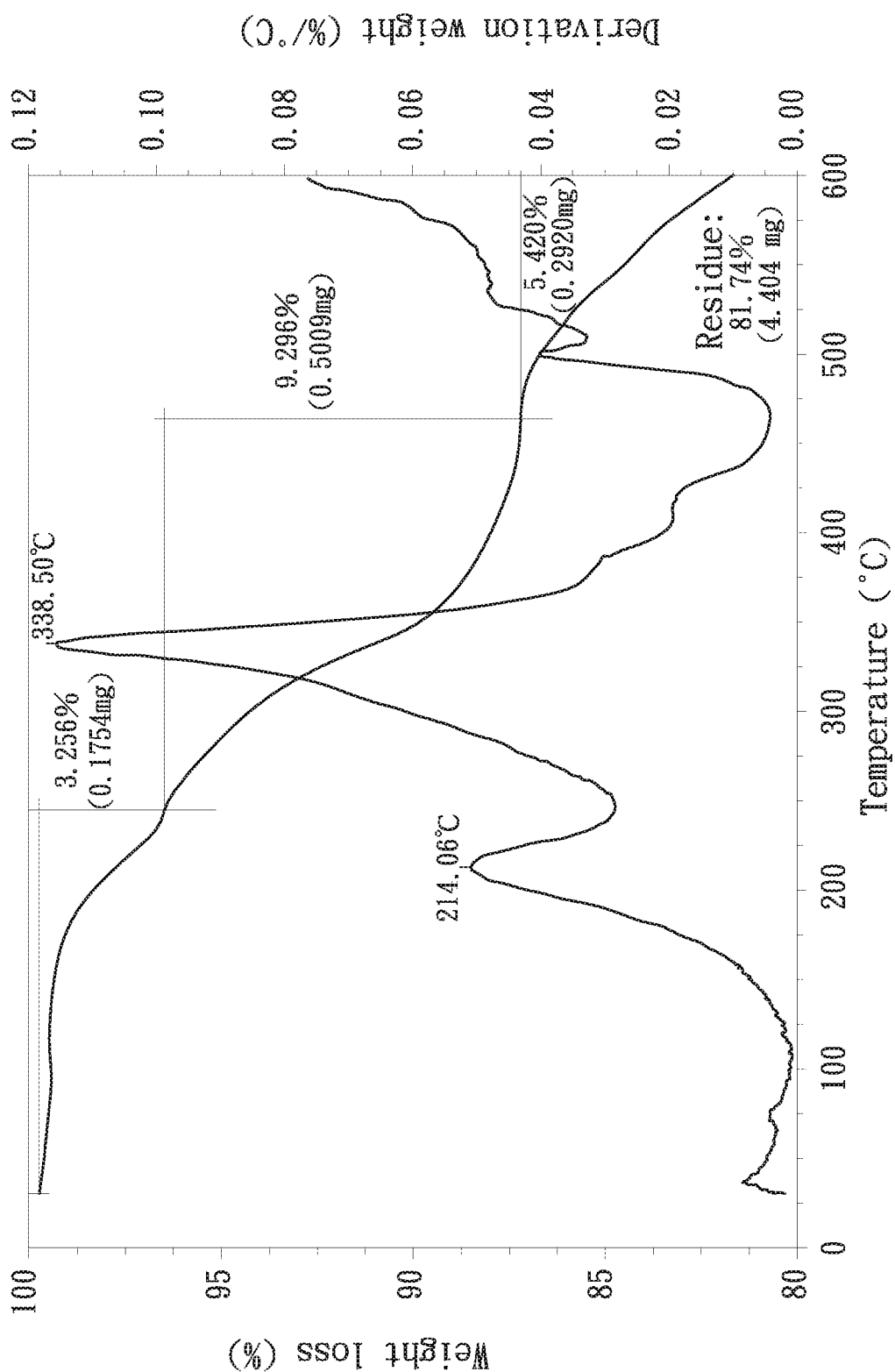
FIG. 4 illustrates a thermogravimetric analysis (TGA) thermogram of the fluorescent material obtained in Example 4.

From the result shown in FIG. 4, the fluorescent material E4 has a weight loss of 12.552% (3.256%+9.296%) at 460° C., and the weight loss portion of the fluorescent material E4 should be the $NH_3^+$ group-containing ions and the $COO^+$ group-containing ions.

[Fluorescence Property]

Test

Each of the fluorescent materials E1 to E5 and CE1 to CE5 was subjected to the following test. 10~20 mg of each of the samples (fluorescent materials) was mixed separately with 5 ml of toluene and 5 ml of propylene glycol methyl ether acetate (PGMEA) to obtain two test solutions, respectively. Then, the test solutions were placed under 450 nm wavelength light for observation of the emitted color of the test solutions. The results were listed in the following Table 1.

Result

From the result shown in Table 1, all of the fluorescent materials E1 to E5 have fluorescence properties in both toluene and PGMEA, and all of the fluorescent materials CE1 to CE5 fail to have fluorescence properties in PGMEA.

In sum, the fluorescent material, which has the $NH_3^+$ ion contained ligands (the first ligands) formed from the amine composition with a total hydrogen bonding Hansen solubility parameter ($T\delta_H$) ranging from 2.4 to 0.3 (cal/cm³)$^{1/2}$, and which has the $COO^-$ ion contained ligands (the second ligands) formed from the acid composition with a total polar Hansen solubility parameter ($T\delta_P$) less than 1.4 (cal/cm³)$^{1/2}$, may maintain stable fluorescence properties in solvent(s) commonly used for photoresist.

embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A fluorescent material comprising:
   at least one fluorescent compound having a structure formula of $ABX_ZY_{3-Z}$, where
   A is Cs, $CH_3NH_3$, or $CH(NH_2)_2$,
   B is Pb, Sn or Sr,
   X and Y are different atoms, and are independently selected from the group consisting of Cl, Br, and I, with the proviso that when one of X and Y is Cl, the other one of X and Y is not I, and
   $0 \leq Z \leq 3$;
   a plurality of $NH_3^+$ group-containing ions which are the same or different ions, and which are made from protonation of an amine composition, said amine composition being composed of at least one type of amine group-containing compound, and having a total hydrogen bonding Hansen solubility parameter ($T\delta_H$) which ranges from 2.4 to 3.3 (cal/cm³)$^{1/2}$; and
   a plurality of $COO^-$ group-containing ions which are the same or different ions, and which are made from

TABLE 1

| Fluorescent compound | Amine composition | $T\delta_H$ (cal/cm³)$^{1/2}$ | Acid composition | $T\delta_P$ (cal/cm³)$^{1/2}$ | Fluorescence property toluene | PGMEA |
|---|---|---|---|---|---|---|
| E1 | CsPbBr$_3$ | D2010* | 3.11 | PE* | 0.89 | Green | Green |
| E2 | CsPbBr$_3$ | M2005* | 3.09 | PE | 0.89 | Green | Green |
| E3 | CsPbBrI$_2$ | D2010 Oleylamine | 2.94 | PE | 0.89 | Red | Red |
| E4 | CsPbCl$_{1.5}$Br$_{1.5}$ | D2010 | 3.11 | PE | 0.89 | Blue | Blue |
| E5 | CsPbBr$_3$ | D2010 | 3.11 | Oleic acid | 1.31 | Green | Green |
| CE1 | CsPbBr$_3$ | Oleylamine | 2.31 | Oleic acid | 1.31 | Green | — |
| CE2 | CsPbBr$_3$ | Oleylamine | 2.31 | PE | 0.89 | Green | — |
| CE3 | CsPbBr$_3$ | D2010 | 3.11 | Sebacic acid | 2.32 | —* | — |
| CE4 | CsPbBr$_3$ | Amantadine | 3.80 | PE | 0.89 | — | — |
| CE5 | CsPbBr$_3$ | C12 diamine* | 3.41 | PE | 0.89 | — | — |

*D2010: polyetherdiamine, a commercial product of Jeffamine ® D2010 available from Huntsman
*M2005: polyetheramine, a commercial product of Jeffamine ® M2005 available from Huntsman
*C12 diamine: 1,12-dodecane-diamine
*PE: Acid composition PE prepared in Preparation Example
*"—" means no fluorescence was observed.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one deprotonation of an acid composition, said acid composition being composed of at least one type of carboxyl group-containing compound, and having a total polar Hansen solubility parameter ($T\delta_P$) which is less than 1.4 (cal/cm³)$^{1/2}$, wherein said total hydrogen bonding Hansen solubility parameter ($T\delta_H$) satisfies $$T\delta_H = \sum_x W_x \times \delta_{H,x}$$

where x is a number of the at least one type of said amine group-containing compound, $W_x$ is a weight ratio of said amine group-containing compound based on the total weight of said amine composition, and $\delta_{H,x}$ is a hydrogen bonding Hansen solubility parameter of said amine group-containing compound;

wherein said total polar Hansen solubility parameter ($T\delta_P$) satisfies $$T\delta_P = \sum_y W_y \times \delta_{P,y}$$

where y is a number of the at least one type of said carboxyl group-containing compound, $W_y$ is a weight ratio of said carboxyl group-containing compound based on the total weight of said acid composition, and $\delta_{P,y}$ is a polar Hansen solubility parameter of said carboxyl group-containing compound; and wherein said $NH_3^+$ group-containing ions and said $COO^-$ group-containing ions are bound to said fluorescent compound.

2. The fluorescent material according to claim 1, wherein said amine group-containing compound is selected from the group consisting of (alkyl)polyetheramine, and polyetherdiamine.

3. The fluorescent material according to claim 1, wherein said carboxyl group-containing compound is selected from the group consisting of olefin acid, a copolymer of (meth)acrylic acid and (meth)acrylic acid alkyl ester, and a copolymer of (meth)acrylic acid, (meth)acrylic acid alkyl ester, and hydroxyalkyl acrylate.

4. The fluorescent material according to claim 1, wherein the fluorescent compound is selected from the group consisting of $CsPbBr_3$, $CsPbCl_3$, $CsPbI_3$, $CsPbCl_ZBr_{3-Z}$, and $CsPbBr_ZI_{3-Z}$.

5. The fluorescent material according to claim 4, wherein said amine group-containing compound is polyetherdiamine.

6. The fluorescent material according to claim 4, wherein said amine group-containing compound is polyetheramine or alkyl polyetheramine.

7. The fluorescent material according to claim 4, wherein said carboxyl group-containing compound is a copolymer of (meth)acrylic acid and (meth)acrylic acid alkyl ester.

8. A method for making the fluorescent material according to claim 1, comprising the steps of:

(i) heating and reacting a mixture of the amine composition, the acid composition, and at least one halide compound with a structure formula of $BW_2$, to obtain a precursor, wherein W is Cl, Br, or I, with the proviso that when two types of the halide compounds are being used, the two types are not $BCl_2$ and $BI_2$, respectively; and (ii) heating and reacting a mixture of the precursor and a first solution composed of a solvent and a compound containing moiety A of the $ABX_ZY_{3-Z}$ structure, to obtain the fluorescent material.

9. The method according to claim 8, wherein the first solution is prepared by reacting a salt containing the moiety A, with an organic acid in the solvent.

10. The method according to claim 8, wherein the halide compound is selected from the group consisting of $PbBr_2$, $PbCl_2$, and $PbI_2$.

11. The method according to claim 8, wherein the amine group-containing compound is selected from the group consisting of (alkyl)polyetheramine, and polyetherdiamine.

12. The method according to claim 8, wherein the carboxyl group-containing compound is selected from the group consisting of olefin acid, a copolymer of (meth)acrylic acid and (meth)acrylic acid alkyl ester, and a copolymer of (meth)acrylic acid, (meth)acrylic acid alkyl ester, and hydroxyalkyl acrylate.

13. The method according to claim 8, wherein the first solution is in an amount ranging from 3.0 to 4.5 parts by weight, the amine composition is in an amount ranging from 2 to 30 parts by weight, and the acid composition is in an amount ranging from 5 to 30 parts by weight, based on 1 part by weight of the at least one halide compound.

* * * * *